United States Patent
Chen et al.

(10) Patent No.: US 9,112,404 B2
(45) Date of Patent: Aug. 18, 2015

(54) MULTIPLIER-DIVIDER CIRCUIT AND AC-TO-DC POWER CONVERTING APPARATUS INCORPORATING THE SAME

(71) Applicant: RICHTEK TECHNOLOGY CORP., Hsinchu County (TW)

(72) Inventors: Chien-Hung Chen, Hsinchu (TW); Isaac Y. Chen, Hsinchu County (TW); Yi-Wei Lee, Taipei (TW); Jyun-Che Ho, Chiayi County (TW)

(73) Assignee: RICHTEK TECHNOLOGY CORP., Hsinchu County (TW)

( * ) Notice: Subject to any disclaimer, the term of this patent is extended or adjusted under 35 U.S.C. 154(b) by 127 days.

(21) Appl. No.: 14/097,042

(22) Filed: Dec. 4, 2013

(65) Prior Publication Data

US 2015/0070951 A1   Mar. 12, 2015

(30) Foreign Application Priority Data

Sep. 6, 2013   (TW) .............................. 102132239 A (51) Int. Cl.
*H02M 1/42* (2007.01)
*H02M 7/06* (2006.01)

(52) U.S. Cl.
CPC .............. *H02M 7/06* (2013.01); *H02M 1/4225* (2013.01)

(58) Field of Classification Search
CPC ..................................................... H02M 1/4225
See application file for complete search history.

(56) References Cited

U.S. PATENT DOCUMENTS

| | | | |
|---|---|---|---|
| 5,555,168 A * | 9/1996 | Ferrario | 363/89 |
| 7,057,440 B2 | 6/2006 | Yang et al. | |
| 2008/0272748 A1 * | 11/2008 | Melanson | 323/207 |
| 2008/0290846 A1 * | 11/2008 | Kanouda et al. | 323/222 |
| 2010/0066337 A1 * | 3/2010 | Gong et al. | 323/285 |
| 2010/0315849 A1 * | 12/2010 | Ingemi et al. | 363/89 |

\* cited by examiner

*Primary Examiner* — Timothy J Dole
*Assistant Examiner* — Ishrat Jamali
(74) *Attorney, Agent, or Firm* — Osha Liang LLP (57) ABSTRACT

An AC-to-DC power converting apparatus includes a power factor correction circuit generating a DC output voltage based on a rectified voltage obtained through rectifying an AC input voltage and on a PWM signal generated based on an adjustment current and a predetermined ramp signal. A multiplier-divider circuit includes: a ramp generating unit generating a ramp signal based on a clock signal and on a first detection voltage associated with the rectified voltage; a control unit generating a control signal based on the clock signal, the ramp signal, and a detection voltage generated based on the DC output voltage; and an output unit generating an adjustment signal based on an input signal associated with the rectified voltage and the control signal.

26 Claims, 9 Drawing Sheets

MULTIPLIER-DIVIDER CIRCUIT AND AC-TO-DC POWER CONVERTING APPARATUS INCORPORATING THE SAME

CROSS-REFERENCE TO RELATED APPLICATION

This application claims priority to Taiwanese Application No. 102132239, filed on Sep. 6, 2013, the contents of which are hereby incorporated by reference.

BACKGROUND OF THE INVENTION

1. Field of the Invention

The invention relates to a power converting apparatus, and more particularly to an AC-to-DC power converting apparatus having a multiplier-divider circuit.

2. Description of the Related Art

Figure 1:
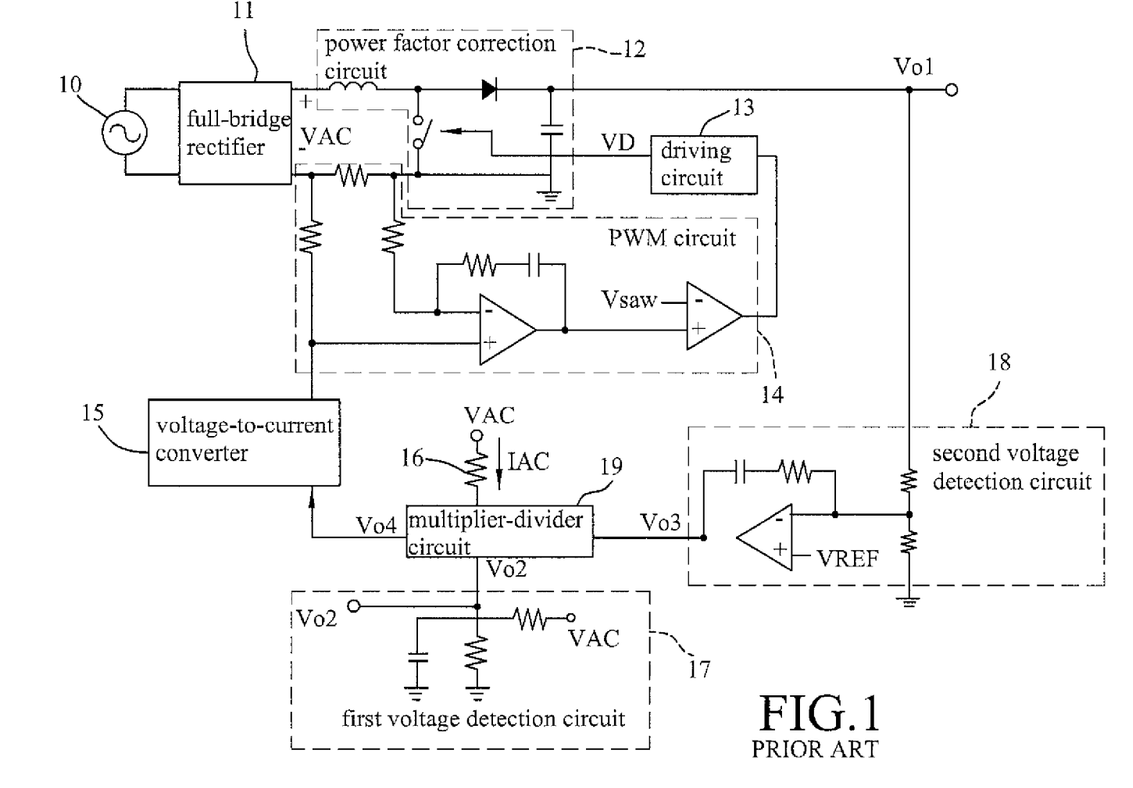
FIG. 1 is a schematic circuit block diagram illustrating a conventional AC-to-DC power converting apparatus.

FIG. 1 illustrates a conventional AC-to-DC power converting apparatus disclosed in U.S. Pat. No. 7,057,440. The conventional AC-to-DC power converting apparatus converts an AC input voltage supplied by an AC power source 10 to a DC output voltage (Vc1), and includes a full-bridge rectifier 11, a power factor correction (PFC) circuit 12, a driving circuit 13, a pulse width modulation (PWM) circuit 14, a voltage-to-current converter 15, a first voltage detection circuit 17, a second voltage detection circuit 18 and a multiplier-divider circuit 19. The PFC circuit 12 adjusts and outputs the DC output voltage (Vc1) based on a driving signal (VD) from the driving circuit 13. The multiplier-divider circuit 19 generates an output signal (Vo4) associated with the driving signal (VD) based on an input current (IAC), which is converted from an input voltage (VAC) by a resistor 16, an input signal (Vo2) from the first voltage detection circuit 17, and an input signal (Vo3) from the second voltage detection circuit 18.

Figure 2:
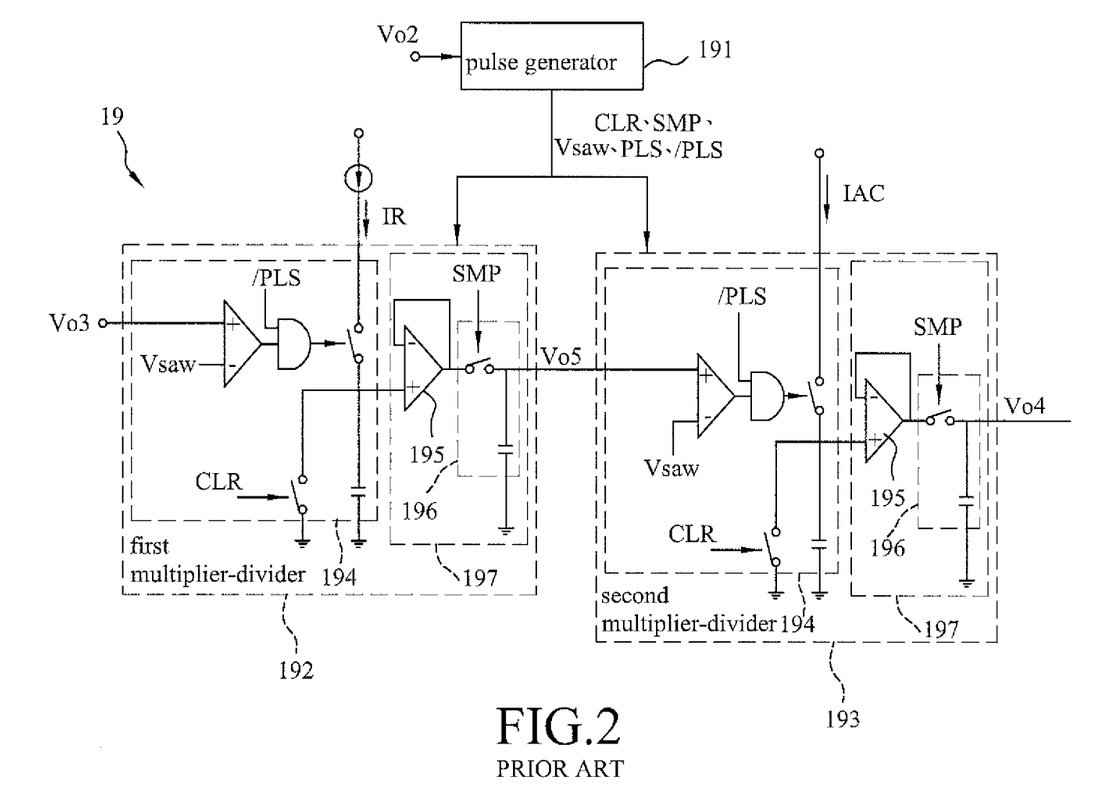
FIG. 2 is a schematic circuit block diagram illustrating a multiplier-divider circuit of the conventional AC-to-DC power converting apparatus.

With further reference to FIG. 2, the multiplier-divider circuit 19 includes a pulse generator 191, a first multiplier-divider 192 and a second multiplier-divider 193. The pulse generator 191 generates, based on the input signal (Vo2), a plurality of control signals (Vsaw, PLS, /PLS, CLR, SMP). The first multiplier-divider 192 generates a sampling signal (Vo5) based on the input signal (Vo3) from the second voltage detection circuit 18, on an input current (IR) and on the control signals (Vsaw, PLS, /PLS, CLR, SMP) from the pulse generator 191. The second multiplier-divider 193 generates the output signal (Vo4) based on the sampling signal (Vo5) from the first multiplier-divider 192, the input current (IAC), and the control signals (Vsaw, PLS, /PLS, CLR, SMP) from the pulse generator 191. Each of the first and second multiplier-dividers 192, 193 includes a switching unit 194, and an adjusting unit 197 that includes an operational amplifier 195 and a sample-and-holder 196.

In such a configuration, since the control signals (Vsaw, PLS, /PLS, CLR, SMP) are required for operation of each of the first and second multiplier-dividers 192, 193, the pulse generator 191 for generating the control signals (Vsaw, PLS, /PLS, CLR, SMP) has a relatively complicated structure, and operation of each of the first and second multiplier-dividers 192, 193 is relatively complicated as well. Therefore, the conventional AC-to-DC power converting apparatus has a relatively complicated configuration, and is operated in a relatively complicated control manner. In addition, for the first multiplier-divider 192, the sampling signal (Vo5) generated by the sample-and-holder 196 is associated with a response speed of the operational amplifier 195 and input and output signals respectively inputted to and outputted by the operational amplifier 195. In this case, when the response speed is too fast or when one of the input and output signals is out of a respective signal range, distortion of the sampling signal (Vo5) may occur, thereby resulting in distortion of the output signal (Vo4) generated by the second multiplier-divider 193.

SUMMARY OF THE INVENTION

Therefore, an object of the present invention is to provide a multiplier-divider circuit and an AC-to-DC power converting apparatus incorporating the same that can overcome the aforesaid drawbacks of the prior art.

According to one aspect of the present invention, there is provided an AC-to-DC power converting apparatus adapted to convert an AC input voltage to a DC output voltage. The power converting apparatus of this invention comprises a rectifying circuit, a power factor correction circuit, a first voltage detection circuit, a second voltage detection circuit, a multiplier-divider circuit, a voltage-to-current converting circuit and a pulse width modulation (PWM) circuit.

The rectifying circuit is adapted to be coupled to an AC power source supplying the AC input voltage for receiving the AC input voltage therefrom. The rectifying circuit rectifies the AC input voltage to generate a rectified voltage.

The power factor correction circuit is coupled to the rectifying circuit for receiving the rectified voltage therefrom, and generates the DC output voltage based on the rectified voltage and a PWM The first voltage detection circuit is coupled to the rectifying circuit for receiving the rectified voltage therefrom, and generates a first detection voltage based on the rectified voltage.

The second voltage detection circuit is coupled to the power factor correction circuit for receiving the DC output voltage therefrom, and generates a second detection voltage based on the DC output voltage and a predetermined reference voltage.

The multiplier-divider circuit includes a ramp generating unit, a control unit and an output unit. The ramp generating unit is coupled to the first voltage detection circuit for receiving the first detection voltage therefrom, and generates a ramp signal based on the first detection voltage and a clock signal. The ramp signal has a frequency that is positively proportional to that of the clock signal, and an amplitude that is positively proportional to a magnitude of the first detection voltage. The control unit is coupled to the ramp generating unit and the second voltage detection circuit, and receives the ramp signal and the second detection voltage respectively from the ramp generating unit and the second voltage detection circuit. The control unit is operable to generate a control signal based on the ramp signal, the second detection voltage and the clock signal. The control signal has a frequency that is positively proportional to that of the clock signal, and a non-duty cycle that is negatively proportional to the amplitude of the ramp signal and that is positively proportional to a magnitude of the second detection voltage. The output unit is coupled to the control unit for receiving the control signal therefrom, and generates an adjustment signal based on the control signal and on an input signal associated with the rectified voltage. The adjustment signal has a magnitude that is positively proportional to a magnitude of the input signal and to the magnitude of the second detection voltage and that is negatively proportional to the magnitude of the first detection voltage.

The PWM circuit is electrically connected to the output unit of the multiplier-divider circuit and the power factor correction circuit, receives the adjustment signal from the output unit of the multiplier-divider circuit, and generates the PWM signal based on the adjustment signal and a predetermined ramp signal.

According to another aspect of the present invention, there is provided a multiplier-divider circuit for an AC-to-DC converting apparatus. The AC-to-DC converting apparatus includes a rectifying circuit for rectifying an AC input voltage to generate a rectified voltage, and an automatic gain control circuit for generating a DC output voltage based on the rectified voltage, a predetermined ramp signal, and an adjustment signal that is generated by said multiplier-divider circuit. The multiplier-divider circuit of this invention comprises a ramp generating unit, a control unit and an output unit.

The ramp generating unit is adapted to receive a first detection voltage associated with the rectified voltage, and generates a ramp signal based on the first detection voltage and a clock signal. The ramp signal has a frequency that is positively proportional to that of the clock signal, and an amplitude that is positively proportional to a magnitude of the first detection voltage.

The control unit is adapted to receive a second detection voltage associated with the DC output voltage, and is coupled to the ramp generating unit for receiving the ramp signal therefrom. The control unit is operable to generate a control signal based on the ramp signal, the second detection voltage and the clock signal. The control signal has a frequency that is positively proportional to that of the clack signal, and a non-duty cycle that is negatively proportional to the amplitude of the ramp signal and that is positively proportional to a magnitude of the second detection voltage.

The output unit is coupled to the control unit for receiving the control signal therefrom, and generates an adjustment signal based on the control signal and on an input signal associated with the rectified voltage. The adjustment signal has a magnitude that is positively proportional to a magnitude of the input signal and to the magnitude of the second detection voltage and that is negatively proportional to the magnitude of the first detection voltage.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 3:
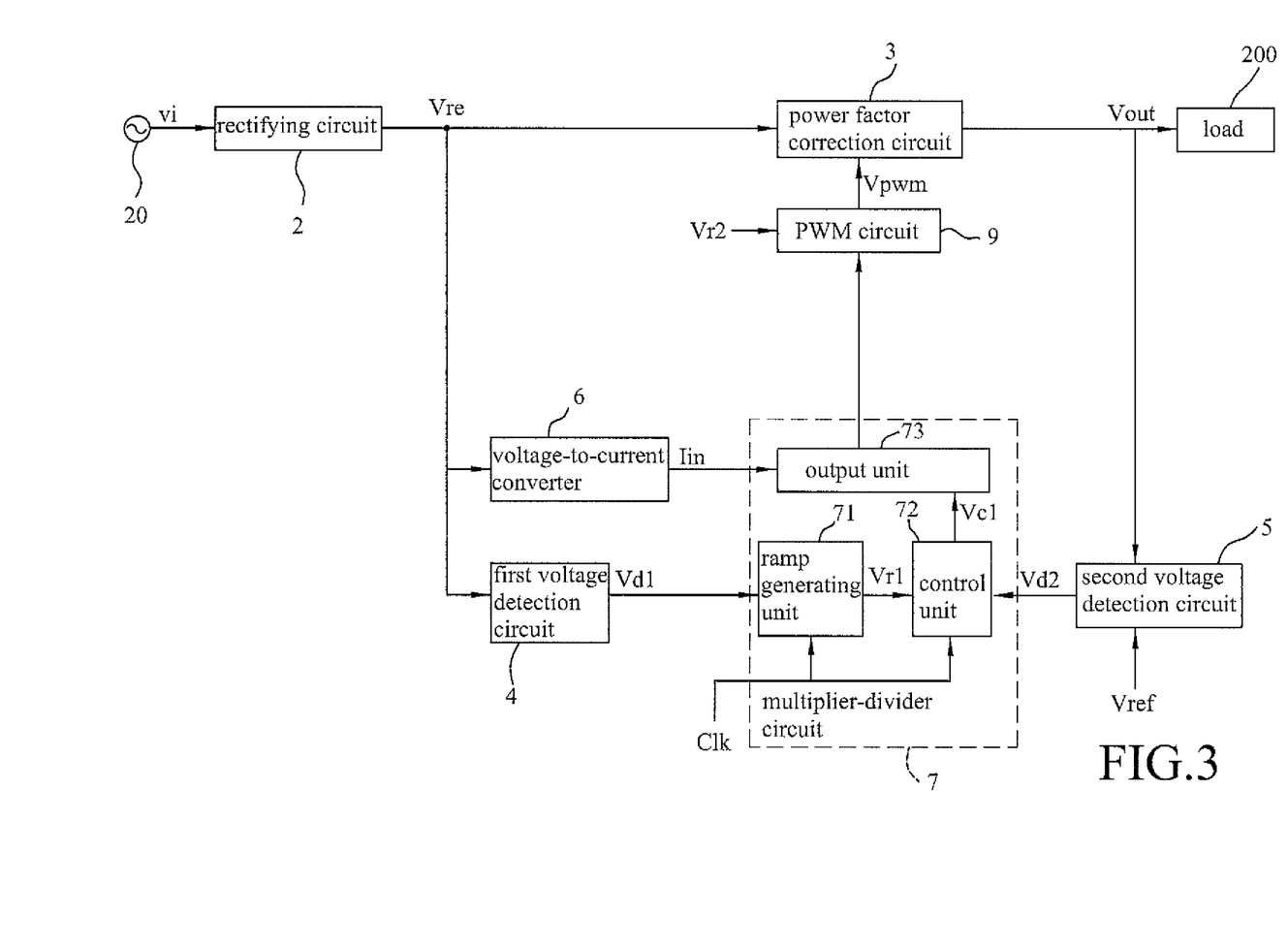
FIG. 3 is a schematic block diagram illustrating the first preferred embodiment of an AC-to-DC power converting apparatus according to the present invention.
Figure 4:
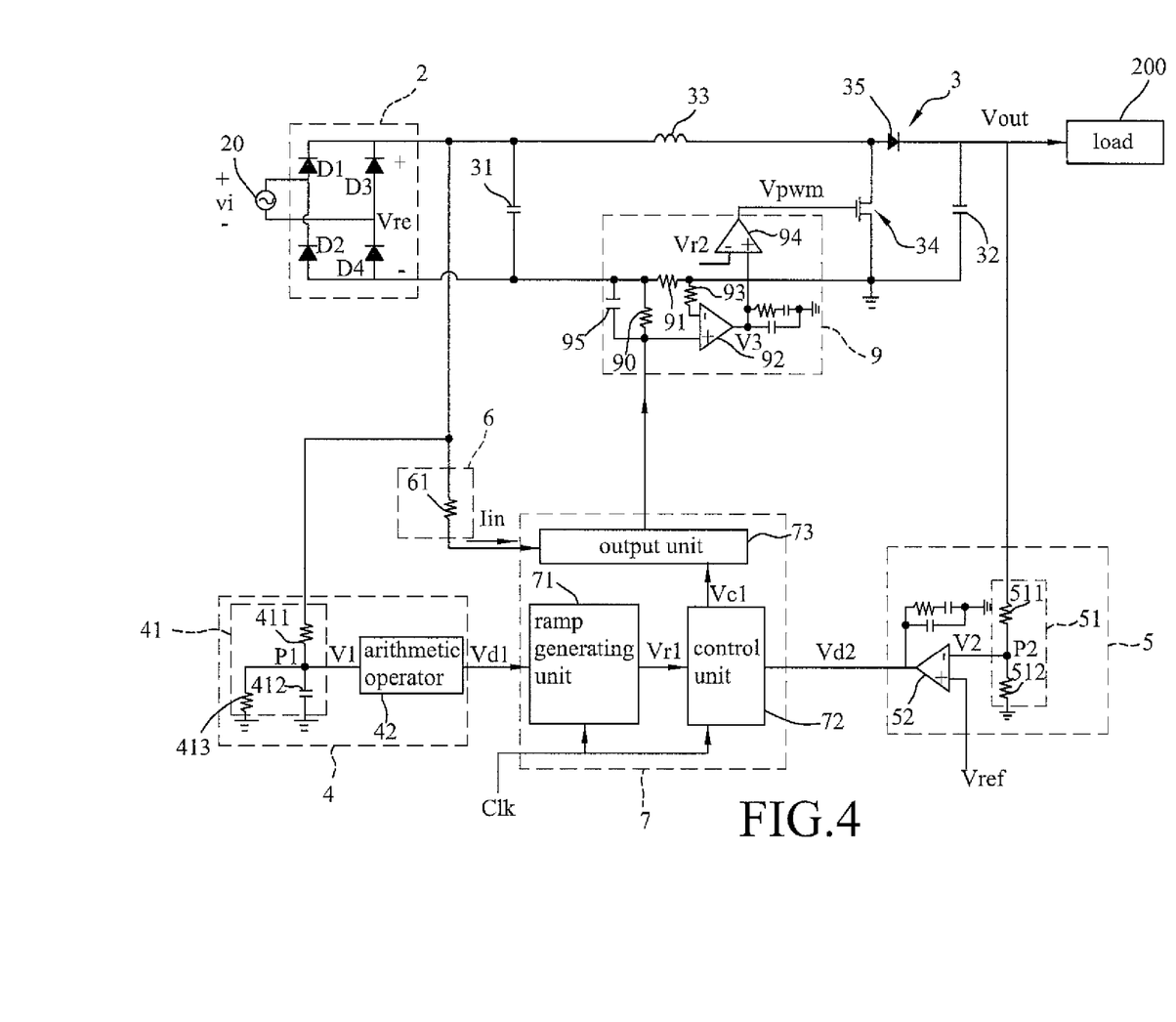
FIG. 4 is a schematic circuit block diagram of the first preferred embodiment.

Referring to FIGS. 3 and 4, the first preferred embodiment of an AC-to-DC power converting apparatus according to the present invention is shown to include a rectifying circuit 2, a power factor correction (PFC) circuit 3, a first voltage detection circuit 4, a second voltage detection circuit 5, a voltage-to-current converter 6, a multiplier-divider circuit 7, a and a pulse width modulation (PWM) circuit 9. The AC-to-DC power converting apparatus is adapted to convert an AC input voltage (vi) supplied by an AC power source 20 to a DC output voltage (Vout) that is then applied to a load 200. The power factor correction circuit 3, the first voltage detection circuit 4, the second voltage detection circuit 5, the voltage-to-current converter 6 and the PWN circuit 9 cooperatively constitute an automatic gain control circuit.

In this embodiment, as shown in FIG. 4, the rectifying circuit 2 is a full-bridge converter, which consists of four diodes (D1~D4), and has an input side that is adapted to be coupled to the AC power source 20 for receiving the AC input voltage (vi), and an output side. The rectifying circuit 2 rectifies the AC input voltage (vi) to generate a rectified voltage (Vre), which is outputted at the output side.

The PFC circuit 3 is coupled to the rectifying circuit 2, and is adapted to be coupled to the load 200. The PFC circuit 3 receives the rectified voltage (Vre) from the rectifying circuit 2, and generates the DC output voltage (Vout) based on the rectified voltage (Vre) and a PWM signal (Vpwm). In this embodiment, as shown in FIG. 4, the PFC circuit 3 includes a first capacitor 31 coupled across the output side of the rectifying circuit 2, a series connection of an inductor 33 and a transistor 34 coupled in parallel to the first capacitor 31, and a series connection of a diode 35 and a second capacitor 32 coupled in parallel to the transistor 34. A voltage across the second capacitor 32 serves as the AC output voltage (Vout). The transistor 34 has a first end coupled to an anode of the diode 35, a grounded second end, and a control end for receiving the PWM signal (Vpwm) such that the transistor 34 conducts or does not conduct in response to the PWM signal (Vpwm). When the transistor 34 conducts in response to the PWM signal (Vpwm), a current flowing through the inductor 33 increases with increase of the rectified voltage (Vre) such that the inductor 33 stores energy through charge accumulation. When the transistor 34 does not conduct in response to the PWM signal (Vpwm), the inductor 33 releases charges accumulated therein to charge the second capacitor 34, thereby raising and adjusting the DC output voltage (Vout). It is noted that, when a duty cycle of the PWM signal (Vpwm) becomes smaller, conduction duration of the transistor 34 becomes shorter and the amount of charges accumulated in the inductor 33 becomes less, thereby reducing the DC output voltage (Vout). Conversely, when the duty cycle of the PWM signal (Vpwm) becomes greater, conduction duration of the transistor 34 becomes longer and the amount of charges accumulated in the inductor 33 becomes greater, thereby raising the DC output voltage (Vout). In this embodiment, the transistor 34 is an N-type MOSFET, which has a drain, a source and a gate serving respectively as the first, second and control ends thereof.

The first voltage detection circuit 4 is coupled to the rectifying circuit 2 for receiving the rectified voltage (Vre) therefrom. The first voltage detection circuit 4 generates a first detection voltage (Vd1). In this embodiment, as shown in FIG. 4, the first voltage detection circuit 4 includes a voltage divider 41 and an arithmetic operator 42. The voltage divider 41 is coupled between the rectifying circuit 2 and ground, and outputs a divided voltage (V1) based on the rectified voltage (Vre) from the rectifying circuit 2. The voltage divider 41 includes a series connection of a resistor 411 and a capacitor 412, and another resistor 413 coupled in parallel to the capacitor 412. The capacitor 412 is coupled to ground. A voltage across the capacitor 412 serves as the divided voltage (V1). The arithmetic operator 42 is coupled to a common node (P1) among the resistors 411, 413 and the capacitor 412, and receives the divided voltage (V1) from the voltage divider 41. The arithmetic operator 42 performs square operation of the divided voltage (V1) to generate the first detection voltage (Vd1).

The second voltage detection circuit 5 is coupled to the PFC circuit 3 for receiving the DC output voltage (Vout) therefrom, and generates a second detection voltage (Vd2) based on the DC output voltage (Vout) and a predetermined reference voltage (Vref). In this embodiment, as shown in FIG. 4, the second voltage detection circuit 5 includes a voltage divider 51 and an operational amplifier 52. The voltage divider 51 is coupled between the PFC circuit 3 and ground, and outputs a divided voltage (V2) based on the DC output voltage (Vout) from the PFC circuit 3. The voltage divider 51 includes two resistors 511, 512 coupled in series to each other, wherein the resistor 512 is coupled to ground and a voltage across the resistor 512 serves as the divided voltage (V2). The operational amplifier 52 has a non-inverting input end that is adapted for receiving the predetermined reference voltage (Vref), an inverting input end that is coupled to a common node (P2) between the resistors 511, 512 for receiving the divided voltage (V2) from the voltage divider 51, and an output end. The operational amplifier 52 outputs, based on the divided voltage (V2) and the predetermined reference voltage (Vref), the second detection voltage (Vd2) at the output end thereof.

The voltage-to-current converter 6 is coupled to the rectifying circuit 2, receives the rectified voltage (Vre), and converts the rectified voltage (Vre) to a current signal (Iin) that serves as an input signal associated with the rectified voltage (Vre). In this embodiment, the voltage-to-current converter 6 includes a resistor 61 through which the rectified voltage (Vre) is converted into the current signal (Iin).

Figure 5:
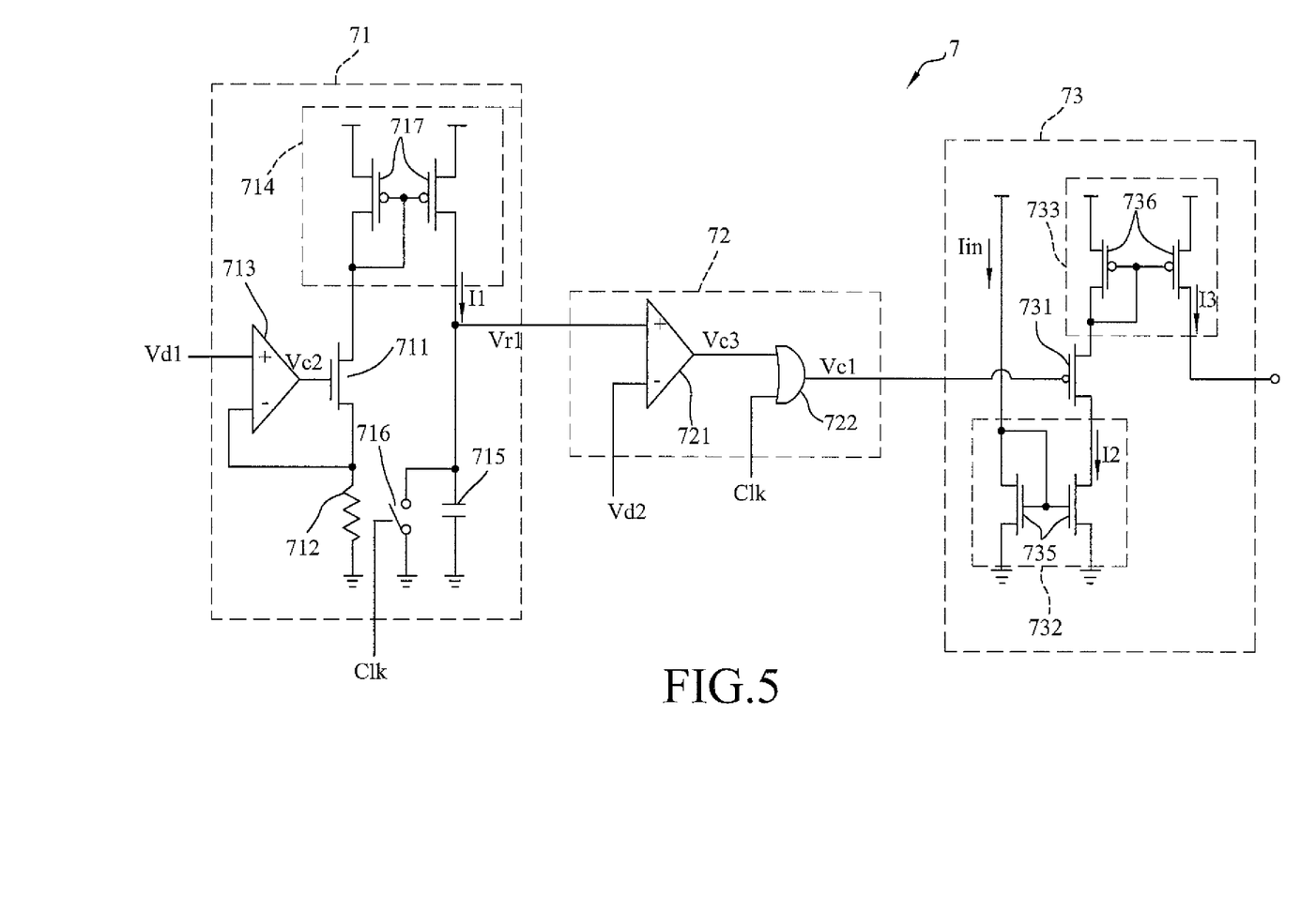
FIG. 5 is a schematic electrical circuit diagram illustrating a multiplier-divider circuit of the first preferred embodiment.

Referring further to FIGS. 4 and 5, the multiplier-divider circuit 7 includes a ramp generating unit 71, a control unit 72 and an output unit 73.

The ramp generating unit 71 is coupled to the arithmetic operator 42 of the first voltage detection circuit 4 for receiving the first detection voltage (Vd1) therefrom, and generates a ramp signal (Vr1) based on the first detection voltage (Vd1) and a clock signal (Clk) (see FIG. 4). In this embodiment, as shown in FIG. 5, the ramp generating unit 71 includes a current source circuit, a capacitor 715, and a switch 716, in which the current source circuit includes, but is not limited to, a first transistor 711, a resistor 712, an operational amplifier 713 and a current mirror 714. The first transistor 711 has a first end, a second end, and a control end for receiving a control voltage (Vc2) such that the first transistor 711 conducts or does not conduct in response to the control voltage (Vc2). The resistor 712 is coupled between the second end of the first transistor 711 and ground. The operational amplifier 713 has a non-inverting input end that is coupled to the first voltage detection circuit 4 for receiving the first detection voltage (Vd1) therefrom, an inverting input end that is coupled to the second end of the first transistor 711 for receiving a voltage across the resistor 712, and an output end that is coupled to the control end of the first transistor 711. The operational amplifier 713 outputs the control voltage (Vc2) at the output end thereof based on the first detection voltage (Vd1) and the voltage across the resistor 712. The current mirror 714 has an input end that is coupled to the first end of the first transistor 711, and an output end. The current mirror 714 includes two second transistors 717 each having a first end, a second end and a control end. The first ends of the second transistors 717 are coupled to each other. The second ends of the second transistors 717 serve respectively as the input and output ends of the current mirror 714. The control ends of the second transistors 717 are coupled to the input end of the current mirror 714. The capacitor 715 is coupled between the output end of the current mirror 714 and ground. The voltage across the capacitor 715 serves as the ramp signal (Vr1). The switch 716 is coupled in parallel to the capacitor 715, and is operable to be conducting or non-conducting in response to the clock signal (Clk). In operation, when the first transistor 711 conducts in response to the control voltage (Vc2), the current mirror 714 permits a reference current to flow out of the input end thereof, and generates a mirroring current (I1) corresponding to the reference current and flowing out of the output end thereof. Thus, the capacitor 715 is charged by the mirroring current (I1) to raise the ramp signal (Vr1), which is the voltage across the capacitor 715 when the switch 716 is non-conducting in response to the clock signal (Clk) being at a low level, and the capacitor 715 discharges to lower the ramp signal (Vr1) to zero when the switch 716 is conducting in response to the clock signal (Clk) being at a high level. In this case, the ramp signal (Vr1) is a ramp-up signal. In addition, the ramp signal (Vr1) has a frequency that is positively proportional to that of the clock signal (Clk), and an amplitude that is positively proportional to a magnitude of the mirror current (I1), which is positively proportional to the voltage across the resistor 712. It is noted that the voltage across the resistor 712 is positively proportional to a magnitude of the first detection voltage (Vd1) such that the magnitude of the mirroring current (I1), which is generated by the current source circuit, is also positively proportional to the magnitude of the first detection voltage (Vd1). As a result, the amplitude of the ramp signal (Vr1)) is positively proportional to the magnitude of the first detection voltage (Vd1).

Figure 5A:
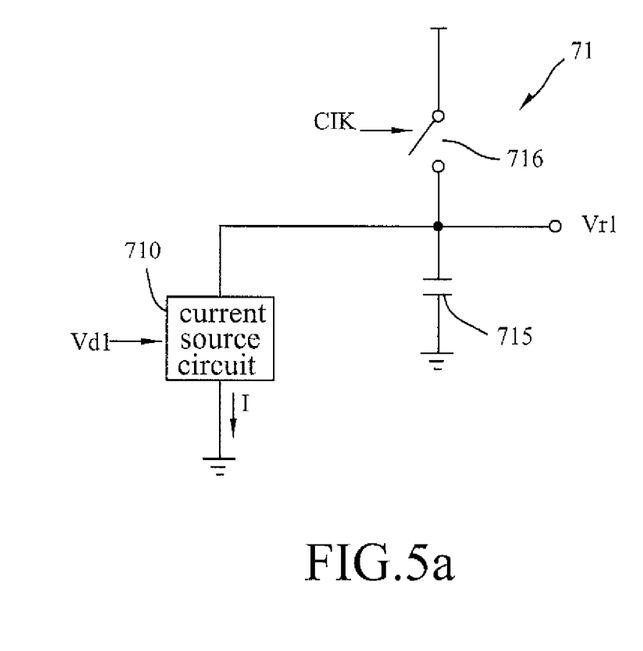
FIG. 5a is a schematic circuit block diagram of a variation of a ramp generating unit of the multiplier-divider circuit of the first preferred embodiment.

FIG. 5a illustrates a variation of the ramp generating unit 71 of FIG. 5, wherein the switch 716 and the capacitor 715 are coupled in series to each other, and are coupled respectively to a predetermined voltage (not shown) and ground. The current source circuit 710 is coupled between a common node between the switch 716 and the capacitor 715, and ground, and receives the first detection voltage (Vd1) for generating a current (I) positively proportional to the first detection voltage (Vd1). In operation, the voltage across the capacitor 715 raises to the predetermined voltage when the switch 716 is conducting in response to the clock signal (Clk) being at the high level. The capacitor 715 discharges based on the current (I) generated by the current source circuit 710 to zero when the switch 716 is non-conducting in response to the clock signal (Clk) being at the low level. Accordingly, the ramp signal (Vr1) is generated. In this case, the ramp signal (Vr1) is a ramp-down signal.

Referring back to FIGS. 4 and 5, the control unit 72 is coupled to the ramp generating unit 71 and the second voltage detection circuit 5, and receives the ramp signal (Vr1) and the second detection voltage (Vd2) respectively from the ramp generating unit 71 and the second voltage detection circuit 5 (see FIG. 3). The control unit 72 is operable to generate a control signal (Vc1) based on the ramp signal (Vr1), the second detection voltage (Vd2) and the clock signal (Clk). In this embodiment, as shown in FIG. 5, the control unit 72 includes a comparator 721 and an OR gate 722. The comparator 721 has a first input end, such as a non-inverting input end, that is coupled to the ramp generating unit 71 for receiving the ramp signal (Vr1) therefrom, a second input end, such as an inverting input end, that is coupled to the second voltage detection circuit 5 for receiving the second detection voltage (Vd2) therefrom, and an output end. The comparator 721 outputs a comparison signal (Vc3) at the output end thereof based on the ramp signal (Vr1) and the second detection voltage (Vd2). The OR gate 722 has a first end that is coupled to the output end of the comparator 721 for receiving the comparison signal (Vc3) therefrom, a second end for receiving the clock signal (Clk), and an output end. The OR gate 722 outputs the control signal (Vc1) at the output end thereof based on the comparison signal (Vc3) and the clock signal (Clk). Thus, the control signal (Vc1) has a frequency that is positively proportional to that of the clock signal (Clk), and a non-duty cycle that is negatively proportional to the amplitude of the ramp signal (Vr1) and that is positively proportional to a magnitude of the second detection voltage (Vd2). It is noted that, in other embodiments, the first and second input ends of the comparator 721 can respectively be an inverting input end and a non-inverting input end, and, accordingly, another logic gate can be selected instead of the OR gate 722.

In this embodiment, the output unit 73 is coupled to the control unit 72 and the voltage-to-current converter 6, and receives the control signal (Vc1) and the current signal (Iin) (i.e., the input signal) respectively from the control unit 72 and the voltage-to-current converter 6 (see FIG. 4). The output unit 73 generates an adjustment signal based on the control signal (Vc1) and the current signal (Iin). As shown in FIG. 5, the output unit 73 includes a first transistor 731, a first current mirror 732 and a second current mirror 733. The first transistor 731 has a first end, a second end, and a control end coupled to the control unit 72 for receiving the control signal (Vc1) therefrom such that the first transistor 731 conducts or does not conduct in response to the control signal (Vc1). The first current mirror 732 has a first input end that is coupled to the voltage-to-current converter 6 for receiving the current signal (Iin) therefrom, and a first output end that is coupled to the second end of the first transistor 731. The first current mirror 732 includes two second transistors 735 each having a first end, a grounded second end and a control end. The first ends of the second transistors 735 serve respectively as the first input end and the first output end of the first current mirror 732. The control ends of the second transistors 735 are coupled to the first input end of the first current mirror 732. The first current mirror 732 generates a first mirroring current (I2) that corresponds to the current signal (Iin) and that flows into the first output end of the first current mirror 732. The second current mirror 733 has a second input end that is coupled to the first end of the first transistor 731, and a second output end. The second current mirror 733 includes two third transistors 736 each having a first end, a second end and a control end. The first ends of the third transistors 736 are coupled to each other. The second ends of the third transistors 736 serve respectively as the second input end and the second output end of the second current mirror 733. The control ends of the third transistors 736 are coupled to the second input end of the second current mirror 733. The second current mirror 733 permits the first mirroring current (I2) to flow out of the second input end thereof when the first transistor 731 conducts in response to the control signal (Vc1), and generates a second mirroring current (I3) that corresponds to the first mirroring current (I2) and that flows out of the second output end of the second current mirror 733. In this embodiment, the second mirroring current (I3) serves as the adjustment signal. In operation, the magnitude of the second mirroring current (I3) is positively proportional to a magnitude of the first mirroring current (I2) (i.e., a magnitude of the current signal (Iin)) and to the conduction duration of the first transistor 731 that is positively proportional to the non-duty cycle of the control signal (Vc1). In view of the above, the non-duty cycle of the control signal (Vc1) is negatively proportional to the amplitude of the ramp signal (Vr1) and is positively proportional to the magnitude of the second detection voltage (Vd2), and the amplitude of the ramp signal (Vr1) is positively proportional to the magnitude of the first detection voltage (Vd1). As a result, the conduction duration of the first transistor 731 is negatively proportional to the magnitude of the first detection voltage (Vd1), and is positively proportional to the magnitude of the second detection voltage (Vd2). Therefore, the magnitude of the adjustment signal (i.e., the second mirroring current (I3)) is positively proportional to the magnitude of the current signal (Iin) and to the magnitude of the second detection voltage (Vd2), but is negatively proportional to the magnitude of the first detection voltage (Vd1).

It is noted that, in this embodiment, the first mirroring current (I2) is obtained by multiplying the current signal (Iin) by the non-duty cycle of the control signal (Vc1) during which the first transistor 731 of the output unit 73 conducts. The first and second current mirrors 732, 733 serve to duplicate current so as to generate the second mirroring current (I3). However, in other embodiments, the number of the current mirrors in the output unit 73 can be varied. In addition, the first transistor 731 of the output unit 73 can be coupled between the voltage-to-current converter 6 and the first input end of the first current mirror 732 or to the second output end of the second current mirror 733.

In this embodiment, each of the transistors 711, 735 is an N-type MOSFET, which has a drain, a source and a gate serving respectively as the first, second and control ends thereof. Each of the transistors 717, 731, 736 is a P-type MOSFET, which has a source, a drain and a gate serving respectively as the first, second and control ends thereof.

Referring again to FIG. 4, the PWM circuit 9 is coupled to the output unit 73 of the multiplier-divider circuit 7 and the PFC circuit 3, and receives the adjustment signal from the multiplier-divider circuit 7. The PWM circuit 9 generates the PWM signal (Vpwm) based on the adjustment signal and a predetermined ramp signal (Vr2). In this embodiment, the PWM circuit 9 includes three resistors 90, 91, 93, an operational amplifier 92, a comparator 94 and a capacitor 95. The resistors 90, 91 are coupled in series between the multiplier-divider circuit 7 and ground. The capacitor 95 is coupled in parallel to the resistor 90. The operational amplifier 92 has a non-inverting input end that is coupled to the resistor 90 for receiving a voltage across the resistors 90, 91 that is associated with the adjustment signal, an inverting input end that is coupled to ground through the resistor 93 for receiving a voltage across the resistor 93, and an output end. The operational amplifier 92 outputs an amplified signal (V3) at the output end thereof based on the voltage across the resistors 90, 91 and the voltage across the resistor 93. The comparator 94 has a non-inverting input end that is coupled to the output end of the operational amplifier 92 for receiving the amplified signal (V3) therefrom, an inverting input end for receiving the predetermined ramp signal (Vr2), and an output end that is coupled to the control end of the transistor 34 of the PFC circuit 3. The comparator 94 outputs the PWM signal (Vpwm) at the output end thereof based on the amplified signal (V3) and the predetermined ramp signal (Vr2) such that the transistor 34 conducts or does not conduct in response to the PWM signal (Vpwm), thereby adjusting the DC output voltage (Vout).

Figure 6:
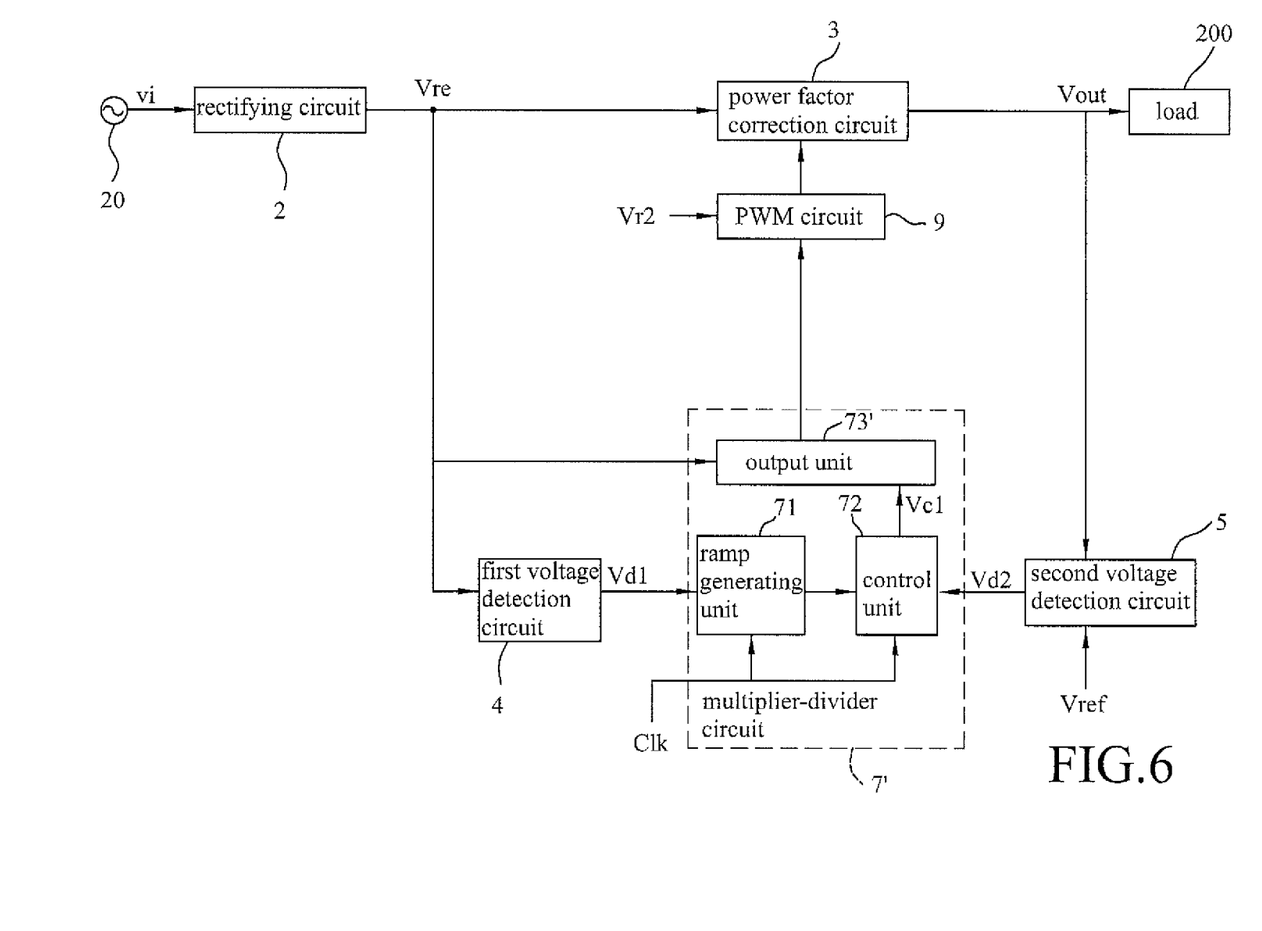
FIG. 6 is a schematic block diagram illustrating the second preferred embodiment of an AC-to-DC power converting apparatus according to the present invention.
Figure 7:
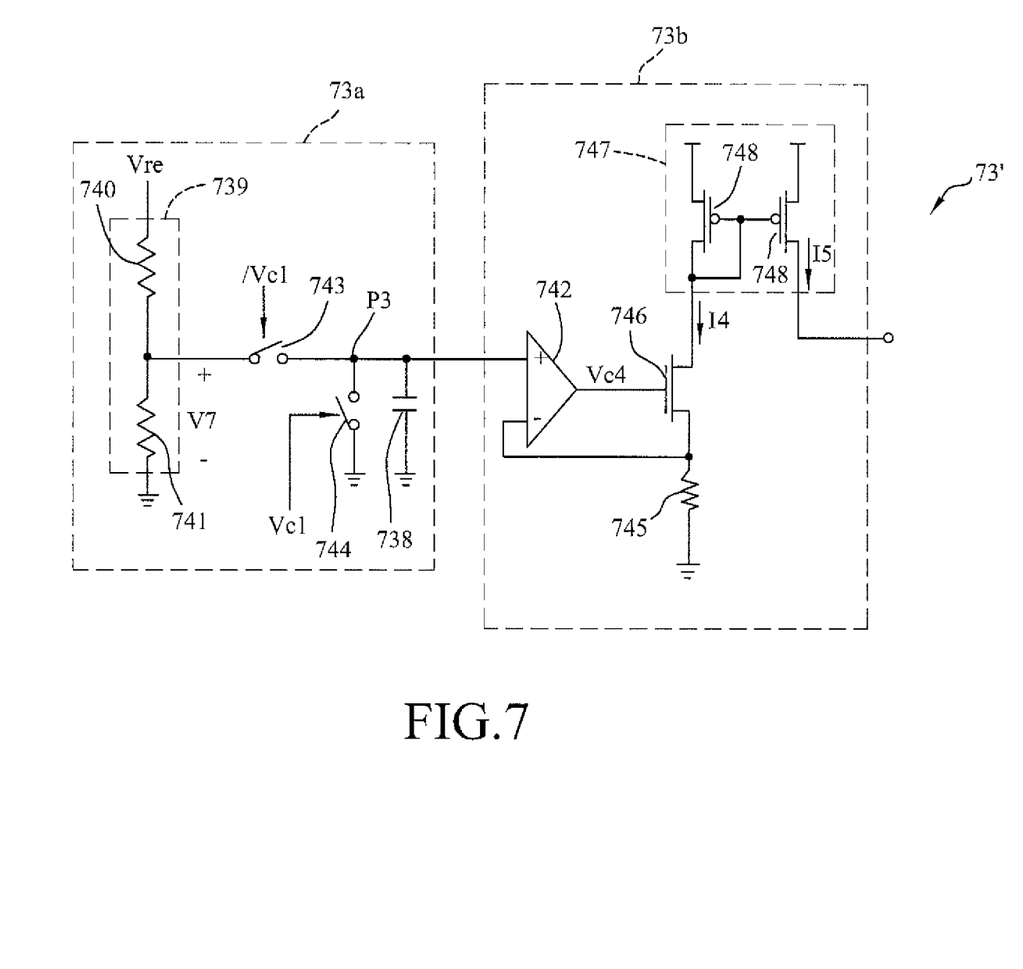
FIG. 7 is a schematic electrical circuit diagram illustrating an output unit of a multiplier-divider circuit of the second preferred embodiment.

FIGS. 6 and 7 illustrate the second preferred embodiment of an AC-to-DC power converting apparatus according to this invention, which is a modification of the first preferred embodiment. Unlike the previous embodiment, the voltage-to-current converter 6 of FIG. 3 is omitted in this embodiment (see FIG. 6). Therefore, the output unit 73' of the multiplier-divider circuit 7' is coupled electrically to the rectifying circuit 2 such that the output unit 73' directly receives the rectified voltage (Vre) from the rectifying circuit 2 and such that the rectified voltage (Vre) serves as the input signal in this embodiment.

In addition, the output unit 73' differs from the output unit 73 in the first preferred embodiment (see FIG. 5). Referring to FIGS. 6 and 7, the output unit 73' includes a duty cycle multiplier (73a) and a voltage-to-current converter (73b).

The duty cycle multiplier (73a) is coupled to the rectifying circuit 2 for receiving the rectified voltage (Vre) therefrom, and generates a voltage output based on the rectified voltage (Vre). In this embodiment, the duty cycle multiplier (73a) includes a voltage divider 739, first and second switches 743, 744, and a capacitor 738. The voltage divider 739 has an input end coupled to the rectifying circuit 2 for receiving the rectified voltage (Vre) therefrom, and an output end, and outputs, based on the rectified voltage (Vre), a divided voltage (V7) at the output end. The voltage divider 739 consists of two resistors 740, 741 coupled in series to each other. The resistor 741 is coupled to ground. A voltage across the resistor 741 serves as the divided voltage (V7). The first and second switches 743, 744 are coupled in series between the output end of the voltage divider 739 and ground. The first switch 743 is coupled to the output end of the voltage divider 739 and is operable to be conducting or non-conducting in response to a switching control signal (/Vc1) complementary to the control signal (Vc1) from the control unit 72. The second switch 744 is coupled to ground and is operable to be conducting or non-conducting in response to the control signal (Vc1). A potential at a common node (P3) between the first and second switches 743, 744 serves as the voltage output. The capacitor 738 is coupled in parallel to the second switch 744 such that the potential at the common node (P3) is identical to a voltage across the capacitor 738. It is noted that the capacitor 738 is optionally used as a filter. In this case, the duty cycle multiplier (73a) serves to multiply the divided voltage (V7), which is positively proportional to the rectified voltage (Vre), and a duty cycle of the switching control signal (/Vc1), which is identical to a conduction duration of the first switch 743 in each cycle, i.e., the non-duty cycle of the control signal (Vc1), so as to generate the voltage output. Therefore, the voltage output is positively proportional to the rectified voltage (Vre) and to the duty cycle of the switching control signal (/Vc1).

The voltage-to-current converter (73b) is coupled to the duty cycle multiplier (73a) for receiving the voltage output therefrom, and converts the voltage output to a current output. In this embodiment, the voltage-to-current converter (73a) of the output unit 73' of the multiplier-divider circuit 7' includes a first transistor 746, a resistor 745, an operational amplifier 742 and a current mirror 747. The first transistor 746 has a first end, a second end, and a control end for receiving a control voltage (Vc4) such that the first transistor 746 is operable to be conducting or non-conducting in response to the control voltage (Vc4). The resistor 745 is coupled between the second end of the first transistor 746 and ground. The operational amplifier 742 has a non-inverting input end coupled to the common node (P3) of the duty cycle multiplier (73a) for receiving the voltage output, an inverting input end coupled to the second end of the first transistor 746 for receiving a voltage across the resistor 745, and an output end coupled to the control end of the first transistor 746. The operational amplifier 742 is operable to output at the output end thereof the control voltage (Vc4) based on the voltage output and the voltage across the resistor 745. The current mirror 747 has an input end coupled to the first end of the first transistor 746, an output end coupled to the PWM circuit 9. The current mirror 747 includes two second transistors 748 each having a first end, a second end and a control end. The first ends of the second transistors 748 are coupled to each other. The second ends of the second transistors 748 serve respectively as the input and output ends of the current mirror 747. The control ends of the second transistors 748 are coupled to the input end of the current mirror 747. In this embodiment, the first transistor 746 is an N-type MOSFET, which has a drain, a source and a gate serving respectively as the first, second and control ends thereof. Each of the second transistors 748 is a P-type MOSFET, which has a source, a drain and a gate serving respectively as the first, second and control ends thereof.

In operation of the output unit 73', when the first transistor 746 conducts in response to the control voltage (Vc4) while the second switch 744 does not conduct in response to the control signal (Vc1), the current mirror 747 permits a reference current (I4) to flow out of the input end thereof, and generates a mirroring current (I5) that corresponds to the reference current (I4) and that flows out of the output end thereof. The mirroring current (I5) is identical to the current output and serves as the adjustment signal. In addition, it is noted that the mirroring current (I5) (i.e., the adjustment signal) has a magnitude positively proportional to that of the reference current (I4). The magnitude of the reference current (I4) is positively proportional to the voltage across the resistor 745. When the first switch 743 conducts, the voltage across the resistor 745 is positively proportional to the control voltage (Vc4) outputted by the operational amplifier 742. The control voltage (Vc4) is positively proportional to the voltage output generated by the duty cycle multiplier (73a) (i.e., the voltage across the capacitor 738). Since, as described above, the voltage output generated by the duty cycle multiplier (73a) is positively proportional to the rectified voltage (Vre) and to the duty cycle of the switching control signal (/Vc1) and since, as described in the first preferred embodiment, the duty cycle of the switching control signal (/Vc1) is negatively proportional to the first detection voltage (Vd1) but is positively proportional to the magnitude of the second detection voltage (Vd2), the magnitude of the mirroring current (I5) is positively proportional to the rectified voltage (Vre) (i.e., the magnitude of the input signal) and to the second detection voltage (Vd2) but is negatively proportional to the magnitude of first detection voltage (Vd1).

Figure 8:
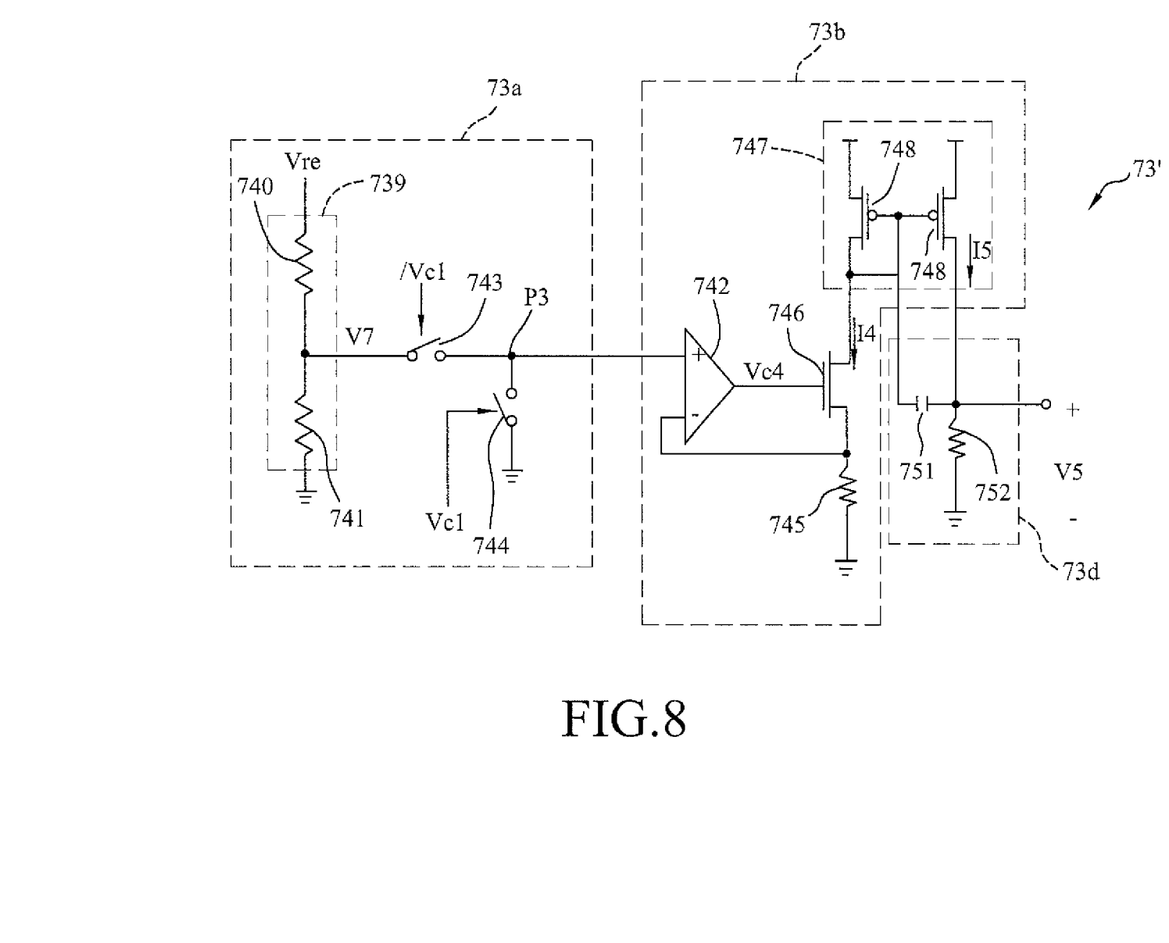
FIG. 8 is a schematic electrical circuit diagram illustrating a variation of the output unit of the multiplier-divider circuit of the second preferred embodiment.

FIG. 8 illustrates a variation of the output unit 73' of the second preferred embodiment. In this embodiment, the capacitor 738 of the duty cycle multiplier (73a) of FIG. 7 is omitted. In addition, the output unit 73' further includes a current-to-voltage converter (73d) coupled to the voltage-to-current converter (73b) for receiving the current output (i.e., the mirroring current (I5)) therefrom, and converting the current output to a voltage (V5) that serves as the adjustment signal. It is noted that the current-to-voltage converter (73d) is an RC circuit functioning as a low-pass filter, and includes a capacitor 751 coupled between the input and output ends of the current mirror 747, and a resistor 752 coupled between the output end of the current mirror 747 and ground. The voltage (V5) serving as the adjustment signal is a voltage across the resistor 752 and is positively proportional to the mirror current (I5).

To sum up, the multiplier-divider circuit 7, 7' is capable of generating the adjustment signal based on the first detection voltage (Vd1) from the first voltage detection circuit 4, the second detection voltage (Vd2) from the second voltage detection circuit 5 and the input signal (i.e., the current signal (Iin) or the rectified voltage (Vre)) without additional control signals (Vsaw, PLS, /PLS, SMP) generated by the pulse generator 191 and required by the first and second multiplier-dividers 192, 193 of the aforesaid conventional AC-to-DC power converting apparatus (see FIG. 2). Thus, the circuit structure and operation of the multiplier-divider circuit 7, 7' are relatively simplified as compared to the first and second multiplier-dividers 192, 193 of FIG. 2. Therefore, the AC-to-DC power converting apparatus of this invention has a relatively simple configuration and can be operated in a relatively simplified control manner. In addition, since the resistor 90 and the capacitor 95 of the PWM circuit 9 cooperatively form a filtering circuit for filtering the adjustment signal from the multiplier-divider circuit 7, 7', distortion of the output signal (Vo4) (see FIG. 2) encountered in the prior art can be avoided. On the other hand, since such filtering circuit is relatively simple compared to the adjusting unit 197 of each of the first and second multiplier-dividers 192, 193 (see FIG. 2), power consumption of the AC-to-DC power converting apparatus of this invention can be reduced.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An AC-to-DC power converting apparatus adapted to convert an AC input voltage to a DC output voltage, said AC-to-DC power converting apparatus comprising:
   a rectifying circuit adapted for receiving the AC input voltage, and rectifying the AC input voltage to generate a rectified voltage;
   a power factor correction circuit coupled to said rectifying circuit for receiving the rectified voltage therefrom, and generating the DC output voltage based on the rectified voltage and a PWM signal;
   a first voltage detection circuit coupled to said rectifying circuit for receiving the rectified voltage therefrom, and generating a first detection voltage based on the rectified voltage;
   a second voltage detection circuit coupled to said power factor correction circuit for receiving the DC output voltage therefrom, and generating a second detection voltage based on the DC output voltage and a predetermined reference voltage;
   a multiplier-divider circuit including
      a ramp generating unit coupled to said first voltage detection circuit for receiving the first detection voltage therefrom, and generating a ramp signal based on the first detection voltage and a clock signal, the ramp signal having a frequency that is positively proportional to that of the clock signal, and an amplitude that is positively proportional to a magnitude of the first detection voltage,
      a control unit coupled to said ramp generating unit and said second voltage detection circuit, and receiving the ramp signal and the second detection voltage respectively from said ramp generating unit and said second voltage detection circuit, said control unit being operable to generate a control signal based on the ramp signal, the second detection voltage and the clock signal, the control signal having a frequency that is positively proportional to that of the clock signal, and a non-duty cycle that is negatively proportional to the amplitude of the ramp signal and that is positively proportional to a magnitude of the second detection voltage and, and
      an output unit coupled to said control unit for receiving the control signal therefrom, and generating an adjustment signal based on the control signal and on an input signal associated with the rectified voltage, the adjustment signal having a magnitude that is positively proportional to a magnitude of the input signal and to the magnitude of the second detection voltage and that is negatively proportional to the magnitude of the first detection voltage; and
   a pulse width modulation (PWM) circuit coupled to said output unit of said multiplier-divider circuit and said power factor correction circuit, receiving the adjustment signal from said output unit of said multiplier-divider circuit, and generating the PWM signal based on the adjustment signal and a predetermined ramp signal.

2. The AC-to-DC power converting apparatus as claimed in claim 1, wherein said ramp generating unit of said multiplier-divider circuit includes:
   a current source circuit for generating, based on the first detection voltage from said first voltage detection circuit, a current that is positively proportional to the first detection voltage;
   a switch coupled to said current source circuit and operable to be conducting or non-conducting in response to the clock signal; and
   a capacitor coupled to said current source circuit and said switch, and capable of being charged or discharging with the current generated by said current source circuit in response to operation of said switch, thereby generating the ramp signal, which is a voltage across said capacitor.

3. The AC-to-DC power converting apparatus as claimed in claim 1, wherein said ramp generating unit of said multiplier-divider circuit includes:
   a first transistor having a first end, a second end, and a control end for receiving a control voltage such that said first transistor conducts or does not conduct in response to the control voltage;
   a resistor coupled between said second end of said first transistor and ground;
   an operational amplifier having a non-inverting input end that is coupled to said first voltage detection circuit for receiving the first detection voltage therefrom, an inverting input end that is coupled to said second end of said first transistor for receiving a voltage across said resistor, and an output end that is coupled to said control end of said first transistor, said operational amplifier outputting the control signal at said output end thereof based on the first detection voltage and the voltage across said resistor;
   a current mirror having an input end that is coupled to said first end of said first transistor, and an output end, said current mirror including two second transistors each of which has a first end, a second end and a control end, said first ends of said second transistors being coupled to each other, said second ends of said second transistors serving respectively as said input and output ends of said current mirror, said control ends of said second transistors being coupled to said input end of said current mirror;

a capacitor coupled between said output end of said current mirror and ground, a voltage across said capacitor serving as the ramp signal; and a switch coupled in parallel to said capacitor, and operable to be conducting or non-conducting in response to the clock signal;

when said first transistor conducts in response to the control voltage, said current mirror permitting a reference current to flow out of said input end thereof, and generating a mirroring current that corresponds to the reference current and that flows out of said output end thereof;

said capacitor being charged by the mirroring current to raise the ramp signal when said switch is non-conducting in response to the clock signal being at a low level, said capacitor discharging to lower the ramp signal when said switch is conducting in response to the clock signal being at a high level.

4. The AC-to-DC power converting apparatus as claimed in claim 1, wherein said control unit of said multiplier-divider circuit includes:

a comparator having a first input end that is coupled to said ramp generating unit for receiving the ramp signal therefrom, a second input end that is coupled to said second voltage detection circuit for receiving the second detection voltage therefrom, and an output end, said comparator outputting a comparison signal at said output end thereof based on the ramp signal and the second detection voltage; and a logic gate having a first end that is coupled to said output end of said comparator for receiving the comparison signal therefrom, a second end for receiving the clock signal, and an output end, said logic gate outputting the control signal at said output end thereof based on the comparison signal and the clock signal.

5. The AC-to-DC power converting apparatus as claimed in claim 4, wherein said first and second input ends of said comparator of said control unit of said multiplier-divider circuit are a non-inverting input end and an inverting input, respectively, and said logic gate is an OR gate.

6. The AC-to-DC power converting apparatus as claimed in claim 1, further comprising a voltage-to-current converter coupled between said rectifying circuit and said output unit of said multiplier-divider circuit, receiving the rectified voltage from said rectifying circuit, and converting the rectified voltage to a current signal that serves as the input signal.

7. The AC-to-DC power converting apparatus as claimed in claim 6, wherein said voltage-to-current converter includes a resistor through which the rectified voltage is transferred into the current signal.

8. The AC-to-DC power converting apparatus as claimed in claim 6, wherein said output unit of said multiplier-divider circuit includes:

a transistor having a first end for receiving the current signal from said voltage-to-current converter, a second end, and a control end coupled to said control unit for receiving the control signal therefrom such that said transistor conducts or does not conduct in response to the control signal; and at least one current mirror for reproducing a current that flows out of said second end of said transistor and that serves as the adjustment signal.

9. The AC-to-DC power converting apparatus as claimed in claim 6, wherein said output unit of said multiplier-divider circuit includes:

a first transistor having a first end, a second end, and a control end coupled to said control unit for receiving the control signal therefrom such that said first transistor conducts or does not conduct in response to the control signal;

a first current mirror having a first input end that is coupled to said voltage-to-current converter for receiving the current signal therefrom, and a first output end that is coupled to said second end of said first transistor, said first current mirror including two second transistors each of which has a first end, a grounded second end and a control end, said first ends of said second transistors serving respectively as said first input end and said first output end of said first current mirror, said control ends of said second transistors being coupled to said first input end of said first current mirror, said first current mirror generating a first mirroring current that corresponds to the current signal and that flows into said first output end of said first current mirror; and a second current mirror having a second input end that is coupled to said first end of said first transistor, and a second output end, said second current mirror including two third transistors each of which has a first end, a second end and a control end, said first ends of said third transistors being coupled to each other, said second ends of said third transistors serving respectively as said second input end and said second output end of said second current mirror, said control ends of said third transistors being coupled to said second input end of said second current mirror, said second current mirror permitting the first mirroring current to flow out of said second input end thereof when said first transistor conducts in response to the control signal, and generating a second mirroring current that corresponds to the first mirroring current and that flows out of said second output end of said second current mirror, the second mirroring current serving as the adjustment signal.

10. The AC-to-DC power converting apparatus as claimed in claim 1, wherein said output unit of said multiplier-divider circuit is coupled to said rectifying circuit for receiving the rectified voltage therefrom such that the rectified voltage serves as the input signal, and includes:

a duty cycle multiplier coupled to said rectifying circuit for receiving the rectified voltage therefrom, and generating a voltage output based on the rectified voltage; and a voltage-to-current converter coupled to said duty cycle multiplier for receiving the voltage output therefrom, and converting the voltage output to a current output.

11. The AC-to-DC power converting apparatus as claimed in claim 10, wherein said duty cycle multiplier of said output unit of said multiplier-divider circuit includes:

a voltage divider having an input end coupled to said rectifying circuit for receiving the rectified voltage therefrom, and an output end, and outputting, based on the rectified voltage, a divided voltage at said output end; and first and second switches coupled in series between said output end of said voltage divider and ground, said first switch being coupled to said output end of said voltage divider and being operable to be conducting or non-conducting in response to a switching control signal complementary to the control signal from said control unit, said second switch being coupled to ground and being operable to be conducting or non-conducting in response to the control signal, a potential at a common node between said first and second switches serving as said voltage output.

12. The AC-to-DC power converting apparatus as claimed in claim 11, wherein said duty cycle multiplier of said output unit of said multiplier-divider circuit further includes a capacitor coupled in parallel to said second switch such that the potential at said common node between said first and second switches is identical to a voltage across said capacitor.

13. The AC-to-DC power converting apparatus as claimed in claim 10, wherein said voltage-to-current converter of said output unit of said multiplier-divider circuit includes:
a first transistor having a first end, a second end, and a control end for receiving a control voltage such that said first transistor is operable to be conducting or non-conducting in response to the control voltage;
a resistor coupled between said second end of said first transistor and ground;
an operational amplifier having a non-inverting input end coupled to said duty cycle multiplier for receiving the voltage output therefrom, an inverting input end coupled to said second end of said first transistor for receiving a voltage across said resistor, and an output end coupled to said control end of said first transistor, said operational amplifier being operable to output at said output end thereof the control voltage based on the voltage output and the voltage across said resistor; and
a current mirror having an input end coupled to said first end of said first transistor, an output end coupled to said PWM circuit, said current mirror including two second transistors each of which has a first end, a second end and a control end, said first ends of said second transistors being coupled to each other, said second ends of said second transistors serving respectively as said input and output ends of said current mirror, said control ends of said second transistors being coupled to said input end of said current mirror;
when said first transistor conducts in response to the control voltage, said current mirror permitting a reference current to flow out of said input end thereof, and generating a mirroring current that corresponds to the reference current and that flows out of said output end thereof, the mirroring current being identical to the current output and serving as the adjustment signal.

14. The AC-to-DC power converting apparatus as claimed in claim 10, wherein said output unit of said multiplier-divider circuit further includes a current-to-voltage converter coupled to said voltage-to-current converter for receiving the current output therefrom, and converting the current output to a voltage that serves as the adjustment signal.

15. A multiplier-divider circuit for an AC-to-DC converting apparatus, the AC-to-DC converting apparatus including a rectifying circuit for rectifying an AC input voltage to generate a rectified voltage, and an automatic gain control circuit for generating a DC output voltage based on the rectified voltage, a predetermined ramp signal, and an adjustment signal that is generated by said multiplier-divider circuit, said multiplier-divider circuit comprising:
a ramp generating unit adapted to receive a first detection voltage associated with the rectified voltage, and generating a ramp signal based on the first detection voltage and a clock signal, the ramp signal having a frequency that is positively proportional to that of the clock signal, and an amplitude that is positively proportional to a magnitude of the first detection voltage,
a control unit adapted to receive a second detection voltage associated with the DC output voltage, and coupled to said ramp generating unit for receiving the ramp signal therefrom, said control unit being operable to generate a control signal based on the ramp signal, the second detection voltage and the clock signal, the control signal having a frequency that is positively proportional to that of the clock signal, and a non-duty cycle that is negatively proportional to the amplitude of the ramp signal and that is positively proportional to a magnitude of the second detection voltage, and
an output unit coupled to said control unit for receiving the control signal therefrom, and generating an adjustment signal based on the control signal and on an input signal associated with the rectified voltage, the adjustment signal having a magnitude that is positively proportional to a magnitude of the input signal and to the magnitude of the second detection voltage and that is negatively proportional to the magnitude of the first detection voltage.

16. The multiplier-divider circuit as claimed in claim 15, wherein said ramp generating unit includes:
a current source circuit for generating, based on the first detection voltage from said first voltage detection circuit, a current that is positively proportional to the first detection voltage;
a switch coupled to said current source circuit, and operable to be conducting or non-conducting in response to the clock signal; and
a capacitor coupled to said current source circuit and said switch, and capable of being charged or discharging with the current generated by said current source circuit in response to operation of said switch, thereby generating the ramp signal, which is a voltage across said capacitor.

17. The multiplier-divider circuit as claimed in claim 15, wherein said ramp generating unit includes:
a first transistor having a first end, a second end, and a control end for receiving a control voltage such that said first transistor conducts or does not conduct in response to the control voltage;
a resistor coupled between said second end of said first transistor and ground;
an operational amplifier having a non-inverting input end that is coupled to said first voltage detection circuit for receiving the first detection voltage therefrom, an inverting input end that is coupled to said second end of said first transistor for receiving a voltage across said resistor, and an output end that is coupled to said control end of said first transistor, said operational amplifier outputting the control voltage at said output end thereof based on the first detection voltage and the voltage across said resistor;
a current mirror having an input end that is coupled to said first end of said first transistor, and an output end, said current mirror including two second transistors each of which has a first end, a second end and a control end, said first ends of said second transistors being coupled to each other, said second ends of said second transistors serving respectively as said input and output ends of said current mirror, said control ends of said second transistors being coupled to said input end of said current mirror;
a capacitor coupled between said output end of said current mirror and ground, a voltage across said capacitor serving as the ramp signal; and a switch coupled in parallel to said capacitor, and operable to be conducting or non-conducting in response to the clock signal;

when said first transistor conducts in response to the control voltage, said current mirror permitting a reference current to flow out of said input end thereof, and generating a mirroring current that corresponds to the reference current and that flows out of said output end thereof;

said capacitor being charged by the mirroring current to raise the ramp signal when said switch is non-conducting in response to the clock signal being at a low level, said capacitor discharging to lower the ramp signal when said switch is conducting in response to the clock signal being at a high level.

18. The multiplier-divider circuit as claimed in claim 15, wherein said control unit includes:

a comparator having a first input end that is coupled to said ramp generating unit for receiving the ramp signal therefrom, a second input end adapted for receiving the second detection voltage, and an output end, said comparator outputting a comparison signal at said output end thereof based on the ramp signal and the second detection voltage; and a logic gate having a first end that is coupled to said output end of said comparator for receiving the comparison signal therefrom, a second end for receiving the clock signal, and an output end, said logic gate outputting the control signal at said output end thereof based on the comparison signal and the clock signal.

19. The multiplier-divider circuit as claimed in claim 18, wherein said first and second input ends of said comparator of said control unit are a non-inverting input end and an inverting input, respectively, and said logic gate is an OR gate.

20. The said multiplier-divider circuit as claimed in claim 15, the input signal being a current signal, wherein said output unit includes:

a transistor having a first end adapted for receiving the current signal, a second end, and a control end coupled to said control unit for receiving the control signal therefrom such that said transistor conducts or does not conduct in response to the control signal; and at least one current mirror for reproducing a current that flows out of said second end of said transistor and that serves as the adjustment signal.

21. The multiplier-divider circuit as claimed in claim 15, the input signal being a current signal, wherein said output unit includes:

a first transistor having a first end, a second end, and a control end coupled to said control unit for receiving the control signal therefrom such that said first transistor conducts or does not conduct in response to the control signal;

a first current mirror having a first input end that is coupled to said voltage-to-current converter for receiving the current signal therefrom, and a first output end that is coupled to said second end of said first transistor, said first current mirror including two second transistors each of which has a first end, a grounded second end and a control end, said first ends of said second transistors serving respectively as said first input end and said first output end of said first current mirror, said control ends of said second transistors being coupled to said first input end of said first current mirror, said first current mirror generating a first mirroring current that corresponds to the current signal and that flows into said first output end of said first current mirror; and a second current mirror having a second input end that is coupled to said first end of said first transistor, and a second output end, said second current mirror including two third transistors each of which has a first end, a second end and a control end, said first ends of said third transistors being coupled to each other, said second ends of said third transistors serving respectively as said second input end and said second output end of said second current mirror, said control ends of said third transistors being coupled to said second input end of said second current mirror, said second current mirror permitting the first mirroring current to flow out of said second input end thereof when said first transistor conducts in response to the control signal, and generating a second mirroring current that corresponds to the first mirroring current and that flows out of said second output end of said second current mirror, the second mirroring current serving as the adjustment signal.

22. The multiplier-divider circuit as claimed in claim 15, the rectified voltage serving as the input signal, wherein said output unit includes:

a duty cycle multiplier adapted for receiving the rectified voltage, and generating a voltage output based on the rectified voltage; and a voltage-to-current converter coupled to said duty cycle multiplier for receiving the voltage output therefrom, and converting the voltage output to a current output.

23. The multiplier-divider circuit as claimed in claim 22, wherein said duty cycle multiplier of said output unit includes:

a voltage divider having an input end coupled to said rectifying circuit for receiving the rectified voltage therefrom, and an output end, and outputting, based on the rectified voltage, a divided voltage at said output end; and first and second switches coupled in series between said output end of said voltage divider and ground, said first switch being coupled to said output end of said voltage divider and being operable to be conducting or non-conducting in response to a switching control signal that is complementary to the control signal from said control unit, said second switch being coupled to ground and being operable to be conducting or non-conducting in response to the control signal, a potential at a common node between said first and second switches serving as said voltage output.

24. The multiplier-divider circuit as claimed in claim 23, wherein said duty cycle multiplier of said output unit further includes a capacitor coupled in parallel to said second switch such that the potential at said common node between said first and second switches is identical to a voltage across said capacitor.

25. The multiplier-divider circuit as claimed in claim 22, wherein said voltage-to-current converter of said output unit includes:

a first transistor having a first end, a second end, and a control end for receiving a control voltage such that said first transistor is operable to be conducting or non-conducting in response to the control voltage;

a resistor coupled between said second end of said first transistor and ground;

an operational amplifier having a non-inverting input end coupled to said duty cycle multiplier for receiving the voltage output therefrom, an inverting input end coupled to said second end of said first transistor for receiving a voltage across said resistor, and an output end coupled to said control end of said first transistor, said operational amplifier being operable to output at said output end thereof the control voltage based on the voltage output and the voltage across said resistor; and a current mirror having an input end coupled to said first end of said first transistor, an output end, said current mirror including two second transistors each of which has a first end, a second end and a control end, said first ends of said second transistors being coupled to each other, said second ends of said second transistors serving respectively as said input and output ends of said current mirror, said control ends of said second transistors being coupled to said input end of said current mirror;

when said first transistor conducts in response to the control voltage, said current mirror permitting a reference current to flow out of said input end thereof, and generating a mirroring current that corresponds to the reference current and that flows out of said output end thereof, the mirroring current being identical to the current output and serving as the adjustment signal.

26. The multiplier-divider circuit as claimed in claim 22, wherein said output unit further includes a current-to-voltage converter coupled to said voltage-to-current converter for receiving the current output therefrom, and converting the current output to a voltage that serves as the adjustment signal.

* * * * *